United States Patent
Ryu et al.

(10) Patent No.: US 9,531,668 B2
(45) Date of Patent: Dec. 27, 2016

(54) MICRO SERVER, METHOD OF ALLOCATING MAC ADDRESS, AND COMPUTER READABLE RECORDING MEDIUM

(71) Applicant: Samsung Electronics Co., Ltd., Suwon-si (KR)

(72) Inventors: Ha-uk Ryu, Suwon-si (KR); Chang-sung Lee, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 55 days.

(21) Appl. No.: 14/575,081

(22) Filed: Dec. 18, 2014

(65) Prior Publication Data

US 2015/0195246 A1    Jul. 9, 2015

(30) Foreign Application Priority Data

Jan. 6, 2014 (KR) ........................ 10-2014-0001136

(51) Int. Cl.
*H04L 29/12* (2006.01)
*G06F 9/455* (2006.01)
*G06F 21/85* (2013.01)

(52) U.S. Cl.
CPC ........... *H04L 61/6022* (2013.01); *G06F 9/455* (2013.01); *G06F 21/85* (2013.01); *H04L 61/2038* (2013.01); *G06F 2009/45595* (2013.01)

(58) Field of Classification Search
CPC ...... G06F 13/4022; G06F 21/85; G06F 9/455; H04L 61/2038; H04L 61/6022

USPC ......................................................... 370/431
See application file for complete search history.

(56) References Cited

U.S. PATENT DOCUMENTS

| | | | | |
|---|---|---|---|---|
| 8,549,517 | B2* | 10/2013 | Koma | H04L 29/12283 718/1 |
| 2005/0163123 | A1* | 7/2005 | Gangadharan | H04L 29/12839 370/392 |
| 2009/0327462 | A1* | 12/2009 | Adams | G06F 9/5077 709/222 |
| 2010/0232443 | A1* | 9/2010 | Pandey | H04L 49/10 370/401 |
| 2011/0103389 | A1* | 5/2011 | Kidambi | H04L 45/586 370/395.1 |
| 2011/0154318 | A1* | 6/2011 | Oshins | G06F 9/45537 718/1 |
| 2011/0274114 | A1* | 11/2011 | Dhar | H04L 49/70 370/401 |
| 2011/0299539 | A1* | 12/2011 | Rajagopal | H04L 12/4675 370/395.53 |

(Continued)

OTHER PUBLICATIONS

Extended European Search Report dated Jun. 5, 2015 in European Patent Application No. 14197039.2.

(Continued)

*Primary Examiner* — Chi H Pham
*Assistant Examiner* — Robert Lopata
(74) *Attorney, Agent, or Firm* — Staas & Halsey LLP

(57) ABSTRACT

A micro server includes a plurality of processor modules, and a network controller configured to control the plurality of processor modules to communicate with an external apparatus through a single physical port. The network controller performs communication by using a plurality of MAC addresses pre-allocated to the micro server.

20 Claims, 11 Drawing Sheets

(56) References Cited

U.S. PATENT DOCUMENTS

| | | | |
|---|---|---|---|
| 2012/0016973 A1* | 1/2012 | Haris | H04L 12/5696 709/220 |
| 2012/0096192 A1* | 4/2012 | Tanaka | G06F 13/385 710/20 |
| 2012/0137288 A1* | 5/2012 | Barrett | G06F 9/45558 718/1 |
| 2012/0159245 A1* | 6/2012 | Brownlow | G06F 11/0712 714/23 |
| 2012/0320918 A1* | 12/2012 | Fomin | H04L 12/4625 370/392 |
| 2013/0024855 A1* | 1/2013 | North | G06F 11/1484 718/1 |
| 2013/0034094 A1* | 2/2013 | Cardona | H04L 49/70 370/360 |
| 2013/0034109 A1* | 2/2013 | Cardona | H04L 49/70 370/419 |
| 2013/0042240 A1* | 2/2013 | Cardona | H04L 49/70 718/1 |
| 2013/0148511 A1* | 6/2013 | Banga | H04L 41/082 370/250 |
| 2013/0148669 A1 | 6/2013 | Noguchi et al. | |
| 2013/0152075 A1* | 6/2013 | Cardona | G06F 9/45558 718/1 |
| 2014/0025821 A1* | 1/2014 | Baphna | H04L 61/2061 709/226 |
| 2014/0067914 A1* | 3/2014 | Nishii | H04L 67/1008 709/203 |
| 2014/0317623 A1* | 10/2014 | Yokoyama | H04L 47/10 718/1 |
| 2015/0043581 A1* | 2/2015 | Devireddy | H04L 49/70 370/392 |

OTHER PUBLICATIONS

Nigel Cain, "Networking in VMM 2012 SP1—Logical Networks (Part I)", Feb. 14, 2013, URL: http:jjweb.archive.orgjweb/20130606053029/http://blogs.technet.com/b/scvmmjarchivej2013/02/14/networking-in-vmm-2012-sp1-logical-networks-part-i.aspx.

* cited by examiner

MICRO SERVER, METHOD OF ALLOCATING MAC ADDRESS, AND COMPUTER READABLE RECORDING MEDIUM

CROSS-REFERENCE TO RELATED APPLICATIONS

This application claims priority under 35 U.S.C. §119(a) from a Korean patent application filed on Jan. 6, 2014 in the Korean Intellectual Property Office and assigned Serial No. 10-2014-0001136, the entire disclosure of which is hereby incorporated by reference.

BACKGROUND OF THE INVENTION

1. Field of the Invention

Apparatuses and methods consistent with exemplary embodiments relate to a micro server, a method of allocating a Media Access Control (MAC) address, and a computer readable recording medium, and more particularly, to a micro server which can allocate a real MAC address to each of a plurality of virtual apparatuses, a method of allocating a MAC address, and a computer readable recording medium.

2. Description of the Related Art

As the Internet and Intranet technology has been developed, there has been an increasing demand on a server technology to process mass data at a high speed. In order to meet this demand, a rack mount type cluster server technology has been introduced. However, the rack mount type cluster server technology has a problem that the server has a large volume and consumes much power, and puts a limit to expanding a system because processor modules are connected through a cable.

A processor module is a server that has been developed to solve such problems and refers to a thinly modularized additional server that is inserted into a body of a micro server system to operate without being stacked like the rack mount type server which has horizontally long rack servers stacked. The processor module may be termed as a high density server in that it can allow a plurality of servers to be inserted and installed in a small space. The processor module has a core element of the server, such as one or more Central Processing Units (CPUs), a memory apparatus, and an operating system, embedded therein, and is supported with power, input and output, additional apparatuses, and various control functions by a main body to serve as a server.

Such a micro server uses I/O virtualization since a plurality of processor modules share a single I/O device. Each processor module requires a MAC address to communicate with an external apparatus even when the I/O virtualization is applied. A conventional method generates a virtual MAC address based on a single real MAC address, and allocates the virtual MAC address to a virtual apparatus (that is, the processor module).

However, the conventional method has the following problems when an S/W license authenticating method based on the MAC address is required. When a network controller provided in the server is replaced, a MAC address of a network apparatus is also changed. Accordingly, when a software (S/W) authenticated program is operated in the virtual apparatus based on the MAC address, a software (S/W) license should be authenticated again due to replacement of the network.

In particular, it is difficult to predict what MAC address will be generated in each virtual apparatus. Therefore, when a Multi Root-Input Output Virtualization (MR-IOV) function is used or when a connection structure between the virtual apparatus of the network controller and a host is changed, the MAC address of the virtual apparatus may be changed and thus a problem may arise when the MAC address-based S/W license authenticating method is used.

SUMMARY OF THE INVENTION

One or more exemplary embodiments provide a micro server which can allocate a real MAC address to each of a plurality of virtual apparatuses, a method of allocating a MAC address, and a computer readable recording medium.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing a micro server including a plurality of processor modules, and a network controller configured to control the plurality of processor modules to communicate with an external apparatus through a single physical port, wherein the network controller perform communication by using a plurality of MAC addresses pre-allocated to the micro server.

The network controller may include a physical apparatus and a virtual apparatus which are mapped onto the plurality of processor modules, and each one of the plurality of MAC addresses pre-allocated to the micro server may be allocated to each of the physical apparatus and the virtual apparatus.

The network controller may include a ROM configured to store the plurality of pre-allocated MAC addresses.

The ROM may store the plurality of pre-allocated MAC addresses and information on whether each of the plurality of MAC addresses is allocated or not in a form of a lookup table.

The ROM may be separable from the network controller.

In response to a request for an initialization of the virtual apparatus, the network controller may allocate one of the plurality of MAC addresses stored in the ROM to the virtual apparatus.

In response to a request for an initialization of the virtual apparatus, the network controller may allocate one of the plurality of MAC addresses to the virtual apparatus, which is requested to be initialized, in one of a sequential allocation method of allocating in sequence, a random allocation method of allocating randomly, and a manager allocation method of allocating according to a specific relationship.

In response to a request for an initialization of the virtual apparatus, one of the plurality of processor modules may allocate one of the plurality of MAC addresses stored in the ROM to the virtual apparatus.

A first processor module of the plurality of processor modules may store the plurality of MAC addresses pre-allocated to the micro server, and, in response to a request for an initialization of the virtual apparatus, a second processor module of the plurality of processor modules may allocate one of the plurality of MAC addresses stored in the first processor module to the virtual apparatus.

The external apparatus may store the plurality of MAC addresses pre-allocated to the micro server, and a first processor module of the plurality of processor modules may allocate one of the plurality of MAC addresses stored in the external apparatus to each virtual apparatus.

The micro server may further include a switch configured to selectively connect the network controller and the plurality of processor modules.

The switch may support Multi Root-Input Output Virtualization (MR-IOV).

The switch may virtualize I/O for the plurality of processor modules by using a full virtualization method using a hypervisor.

The foregoing and/or other features and utilities of the present general inventive concept may also be achieved by providing a method of allocating a MAC address of a micro server, the method including pre-storing a plurality of MAC addresses pre-allocated to the micro server, requesting a virtual apparatus in a network controller to be initialized, and, in response to the request, allocating one of the plurality of MAC addresses to the virtual apparatus.

The pre-storing may include storing the plurality of pre-allocated MAC addresses to a ROM in the network controller.

The ROM may store the plurality of pre-allocated MAC addresses and information on whether each of the plurality of MAC addresses is allocated or not in a form of a lookup table.

The allocating may include allocating one of the plurality of MAC addresses to the virtual apparatus, which is requested to be initialized, in one of a sequential allocation method for allocating in sequence, a random allocation method for allocating randomly, and a manager allocation method for allocating according to a specific relationship.

The allocating may be performed in one of a plurality of processor modules in the micro server.

The pre-storing may include storing the plurality of MAC addresses in a first processor module of a plurality of processor modules in the micro server, and the allocating may be performed by a second processor module of the plurality of processor modules.

The foregoing and/or other features and utilities of the present general inventive concept may be achieved by providing a computer readable recording medium, which performs a MAC address allocation method of a micro server, the MAC address allocation method including pre-storing a plurality of MAC addresses pre-allocated to the micro server; requesting a virtual apparatus in a network controller to be initialized, and, in response to the request, allocating one of the plurality of MAC addresses to the virtual apparatus.

The foregoing and/or other features and utilities of the present general inventive concept may be achieved by providing a micro server including a plurality of processor modules; and a network controller configured to receive from an external apparatus a plurality of MAC addresses each to be exclusively assigned to the corresponding one of the processor modules and to control the plurality of processor modules each to communicate with an external apparatus through a single physical port using the exclusively assigned MAC address.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
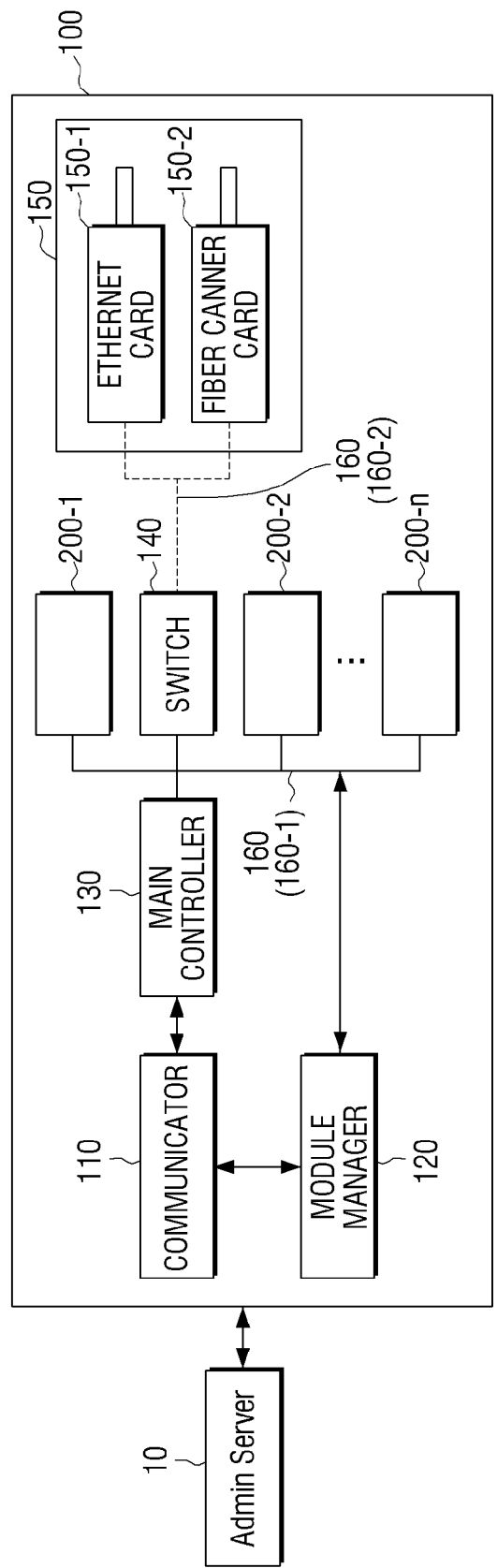
FIG. 1 is a block diagram illustrating a micro server according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a micro server 100 according to an exemplary embodiment of the present general inventive concept.

Referring to FIG. 1, the micro server 100 according to an exemplary embodiment includes a communicator 110, a module manager 120, a main controller 130, a switch 140, an I/O device 150, a common interface bus 160, and a plurality of processor modules 200 (200-1, . . . 200-*n*). Here, n is a positive integer. The micro server 100 may include a base board (not illustrated) on which the communicator 110, the module manager 120, the switch 140, the I/O device 150, and the common interface bus 160 may be formed. The plurality of processor modules 200 (200-1, . . . , 200-*n*) may be mounted in or dismounted from the base board through a slot formed on the base board. The micro server 10 may include other components. Since the other components may be well-known, detail descriptions thereof will be omitted.

The communicator 110 communicates with a management (administration) server 10. The communicator 110 includes a network controller and a Local Area Network (LAN) port, and controls the module manager 120 to communicate with the management server 10. The communicator 110 may communicate with the management server 10 through a network channel (Out Of Band (OOB)) for management of a server that is separated from a network channel for performance of services of the micro server 100. Although the communicator 110 communicates with the management server 10 through a wired LAN port in the present exemplary embodiment, the communicator 110 may communicate with the management server 10 according to other wired communication methods and/or a wireless communication method, in addition to the LAN method.

The module manager 120, which is a Baseboard Management Controller (BMC), collects apparatus information on each of the plurality of processor modules 200 (200-1, . . . , 200-n) and provides an Intelligent Platform Management Interface (IPMI) service for each of the plurality of processor modules 200 (200-1, . . . , 200-n) by using the apparatus information of the plurality of processor modules 200 (200-1, . . . , 200-n). The BMC refers to a microprocessor that is mounted in a server for supporting the IPMI, and may be a BMC for a single micro module or may be a common BMC for the plurality of processor modules 200 (200-1, . . . , 200-n). The apparatus information may include information on a central processing unit (CPU) mounted in the corresponding processor module 200, for example, a CPU type, the number of operation clocks, etc., operation information of the corresponding processor module 200, for example, a mode, power supply, share of the processor, etc., state information of the corresponding processor module 200, for example, information collected from a sensor), information provided by the IPMI, etc.

The IPMI is an open type reference hardware management interface standard that defines a specific method for an embedded management sub system to communicate, and performs monitoring of the processor module 200, logging, recovery, inventory, and hardware control thereof.

The processor module 200 has one or more core elements of a server, such as a single CPU, a memory apparatus, and an operating system, embedded therein, and is supported with power, input and output, additional apparatuses, and various control functions by the micro server 100 to serve as a server. Detailed configuration and operation of the processor module 200 will be explained below with reference to FIG. 2.

The main controller 130 controls the respective elements of the micro server 100. The main controller 130 may control the switch 140 to transmit data received through the I/O device 150 to the respective processor modules 200 by using the common interface bus 160.

The main controller 130 controls the respective processor modules 200 (200-1, . . . , 200-n) mounted in the micro server 100 to configure a specialized system such as a web server, a File Transfer Protocol (FTP) server, a mail server, a database server, etc. For example, when the micro server 100 is used as a web server that many users access a web page simultaneously, the main controller 130 may control the processor modules 200 (200-1, . . . , 200-n) such that the accessed web page uses more processor modules 200 (200-1, . . . , 200-n), or may control a web caching processor connected with only a high speed Internet to perform the corresponding process.

The switch 140 may selectively connect the I/O device 150 and the plurality of processor modules 200 (200-1, . . . , 200-n). The switch 140 selectively connects to one of the plurality of processor modules 200 (200-1, . . . , 200-n) to transmit data received from the I/O device 150 to the corresponding processor module 200 under the control of the controller 130.

The switch 140 may include a Peripheral Component Interconnect (PCI) Express switch circuit (or an MRA PCIe switch) and may selectively adjust a connection relationship between the plurality of processor modules 200 (200-1, . . . , 200-n) and at least one I/O card of the I/O device 150.

The switch 140 may be implemented by using I/O virtualization technology. The I/O virtualization technology refers to technology that can allow a plurality of processor modules to use a single I/O card simultaneously. Such I/O virtualization technology may be implemented by using an apparatus that supports Multi Root-Input Output Virtualization (MR-IOV). A method of allocating a MAC address in such an MR-IOV environment will be explained below with reference to FIGS. 4 to 7.

Since the switch 140 can adjust the connection structure between the processor modules 200 (200-1, . . . , 200-n) and the I/O device 150, it is possible to adjust the connection structure of the processor modules 200 (200-1, . . . , 200-n) without changing physical locations of the I/O device 150 and the processor modules 200 (200-1, . . . , 200-n).

The I/O device 150 includes at least one I/O card and exchanges data with one or more external apparatuses of the micro server 100. The I/O card may be implemented by using a network controller 300, for example, an Ethernet card 150-1, or a fiber channel card 150-2 to control the plurality of processor modules 200 (200-1, . . . , 200-n) to perform communication with one or more external apparatuses through a single physical port. Detailed configuration and operation of the network controller 300 will be explained below with reference to FIG. 3.

The I/O device 150 may receive or transmit data to or from an external apparatus or an external network. The data may be received from or transmitted to the processor modules 200 (200-1, . . . , 200-n) through a PCI Express interface, and the connection with the processor modules 200 (200-1, . . . , 200-n) may be controlled by the switch 140.

The common interface bus 160 is a connection apparatus for connecting the respective elements of the micro server 100 to one another. Specifically, the common interface bus 160 may perform full duplex communication or half duplex communication under the control of the main controller 130. The common interface bus 160 may include a first interface bus 160-1 to connect a control command signal and a second interface bus 160-2 to connect a data signal.

The common interface bus 160 may support at least one of an Inter-Integrated Circuit ($I^2C$) interface, the PCI express interface, a System Management Bus (SMBus) interface, and so on. Accordingly, the first interface bus 160-1 to connect the control command signal may be an $I^2C$ interface bus or an SMBus interface bus, and the second interface bus 160-2 to connect the data signal may be a PCI Express interface bus. In addition, the communication between the module manager 120 and the processor modules 200 may be performed through the first interface bus, which supports the $I^2C$ interface or the SMBus interface.

The $I^2C$ interface is a bus standard that is developed for communicating between a central processing apparatus and a low-speed peripheral and is called a Two Wire Interface (TWI) because this interface uses two strands of wires. The $I^2C$ interface bus uses a synchronization communication method and includes a clock signal and a data signal, and thus is able to perform the full duplex communication with a master apparatus regardless of the number of slave apparatuses. In addition, there may be two or more master apparatuses for one bus and slave apparatuses may be added or removed during an operation of the $I^2C$ interface bus. Accordingly, the above-described main controller 130 and the module manager 120 may be operated as master apparatuses and the above-described plurality of processor modules 200 (200-1, . . . 200-n) may be operated as slave apparatuses.

The PCI Express interface is a local bus standard that has an improved series structure to maintain software-level compatibility with a conventional PCI parallel interface bus and to input and output between apparatuses at a high speed. The PCI Express interface is appropriate to proves mass data. In view of this, the data is transmitted to each processor module 200 through the PCI Express interface bus of the common interface bus 160-2 under the control of the main controller 130.

The SMBus interface is a simple two-wire bus that is used to communicate with low-speed apparatuses disposed in a motherboard and transmits clock, data, and commands, and is an interface based on an I²C series bus protocol.

The data received from the I/O device 150 may be transmitted to the processor module 200 selected by the switch 140 through the PCI Express interface. The switch 140 may select the processor module 200 to transmit data under the control of the main controller 130.

The processor module 200 is connected with the main controller 130 through the common interface bus 160. The processor module 200 may include a module controller that relays connection between the common interface bus 160 and an interface used by a CPU mounted in the processor module 200.

The processor module 200 is connected with the module manager 120 through the common interface bus 160.

As described above, the micro server 100 according to the exemplary embodiment communicates with the external apparatus by using a plurality of MAC addresses pre-allocated to the micro server 100. Therefore, the micro server 100 can continuously use the same MAC addresses even in response to a network card being changed or a host being replaced. Accordingly, the S/W license problem which may be caused by a change in the MAC address can be prevented.

Figure 2:
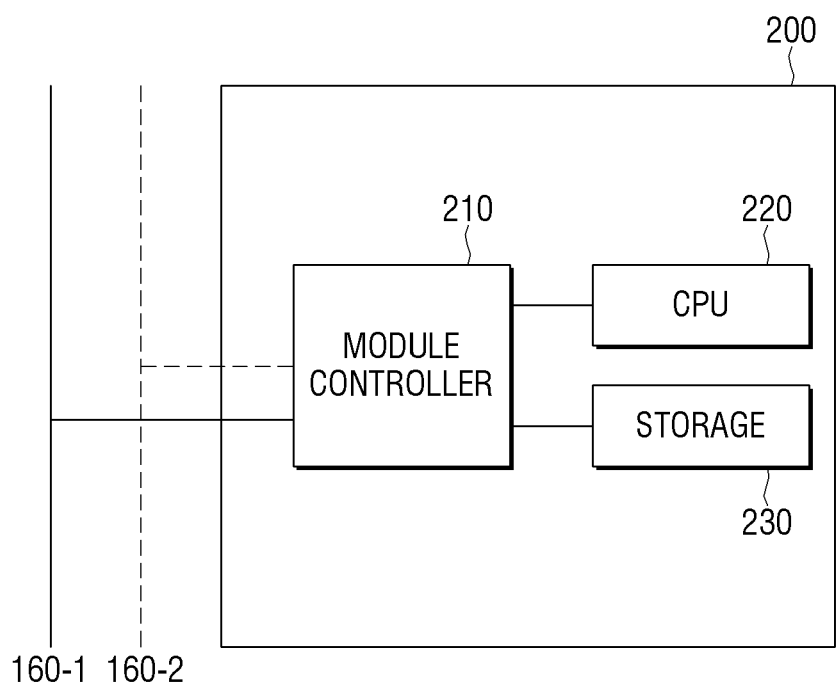
FIG. 2 is a block diagram illustrating a processor module of a micro server according to an exemplary embodiment of the present general inventive concept.

FIG. 2 is a block diagram illustrating the processor module according to an exemplary embodiment of the present general inventive concept.

Referring to FIG. 2, the processor module 200 includes a module controller 210, a CPU 220, and a storage 230. The processor module 200 is a modularized high-density server that can be mounted in the micro server 100, and may include core elements of a server, such as one or more CPUs, a storage, and an operating system. The processor module 200 is mounted in a baseboard of the micro server 100 and is supported with power, input and output, and various control functions by the micro server 100 to serve as a server.

The CPU 220 is a central processing apparatus of the processor module 200, and deciphers a control command and performs arithmetic and logic operations or data processing. The CPU 220 includes a Bus Interface Unit (BIU) and communicates with an external element. The CPU may be an Intel (R) CPU, an ARM (R) CPU, or an ARM CPU.

The module controller 210 is connected with the common interface bus 160 to relay connection between the common interface bus 160 and an interface used by the CPU 220 of the processor module 200. The processor module 200 is designed as an interface corresponding to the CPU 220 mounted in the processor module 200. Accordingly, the module controller 210 may convert the control command and the data according to an interface protocol corresponding to the CPU 220 mounted in the processor module 200 to communicate with the common interface bus of the micro server 100.

The module controller 210 is connected with the BIU of the CPU 220 to exchange the control command and the data with the BIU. For example, when the CPU mounted in the processor module 200 is the Inter (R) CPU, the module controller 210 receives the control command from the main controller 130 of the micro server 100 through the I²C interface bus 160-1, and converts the control command according to an interface of a standard corresponding to the Intel (R) CPU and transmits the converted control command to the CPU 210 and each element of the processor module 200.

The module controller 200 may include a piece of firmware to be used to control the CPU 220 mounted in the processor module 200, and may control the respective elements of the processor module 200. The storage of the processor module 200 stores data usable in the module controller 210 and the CPU 220 of the processor module and/or data to be transmitted to or received from an external apparatus.

Figure 3:
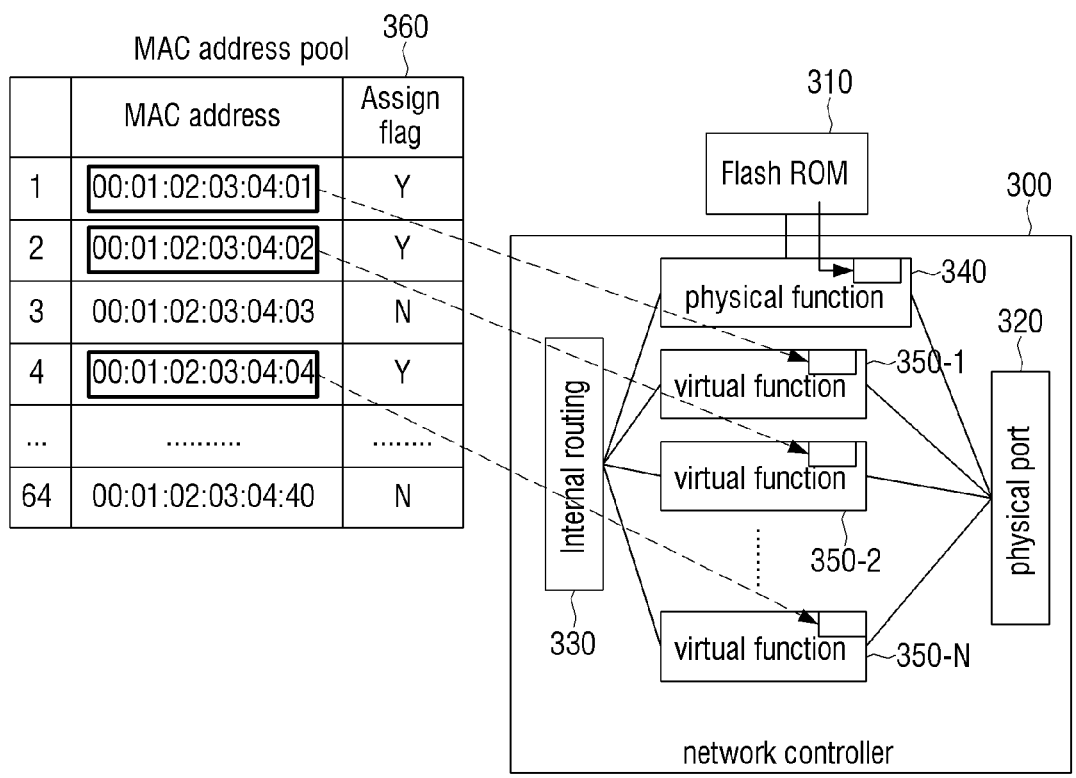
FIG. 3 is a view illustrating a function of a network controller of FIG. 1.

FIG. 3 is a view illustrating a function of the network controller 300 of FIG. 1.

I/O virtualization refers to technology that can allow a plurality of processor modules (or host apparatuses) to use a single I/O card simultaneously. The network controller 300 using the I/O virtualization technology has a single physical apparatus and a plurality of virtual apparatuses connected with each other to share a single physical port.

The network controller 300 may include a memory 310 such as a read only memory (ROM) or a flash ROM, a physical port 320 connected with an external apparatus, a connector 330, a physical apparatus 340, and a plurality of virtual apparatus 350 to perform a virtual function.

The ROM 310 stores a MAC address pool 360 including a plurality of MAC addresses pre-allocated to the micro server 100. The number of pre-allocated MAC addresses may correspond to the number of servers installable in the micro server 100. Each of the pre-allocated MAC addresses is a unique address that does not overlap any other address used in other apparatuses. The ROM 310 may be separated from the network controller 300.

The MAC address is a physical address of the Ethernet that is 48 bits long, and the first 24 bits of the MAC address are allocated to a vendor and the other 28 bits are allocated by the vendor according to the IEEE standards.

Although the MAC addresses are stored in the ROM 310 in the present exemplary embodiment, the MAC addresses may be stored in various places. This will be explained in detail with reference to FIGS. 4 to 7. In addition, although the ROM 310 is located outside the network controller 300 in FIG. 3, the ROM 310 may be located in the network controller 300. However, in order to use the pre-allocated MAC address regardless of replacement of the network controller 300 with a new network controller, the ROM 310 may be separated from the network controller 300.

The physical port 320 is physically connected with an external network or apparatus.

The connector 330 is configured to connect the network controller 300 and the external switch 140 with each other. In this case, the network controller 300 and the external switch 140 may be connected with each other through a PCI/PCIe bus.

The physical apparatus 340 allocates the pre-allocated MAC address to the network controller 300. The physical apparatus 340 is allocated the MAC address to use the MAC addresses stored in the network controller 300 or the ROM 310 connected with the network controller 300.

The MAC address is allocated to the corresponding virtual apparatus 350 by the OS in response to the virtual apparatus 350 being initialized or to be initialized. The allocating operation for the virtual apparatus 350 may be performed by the network controller 300 or may be performed by an external host. The MAC address allocation by the external host will be explained below with reference to FIGS. 4 to 7.

The MAC address may be allocated to the corresponding virtual apparatus 350 in one of the following three allocation methods:

A sequential allocation method is for allocating the first MAC address that has not been allocated to the other apparatuses from among the plurality of MAC addresses according to an initialization order of the virtual apparatuses. A random allocation method is for allocating a certain MAC address that has not yet been allocated from among the plurality of MAC addresses in response to a MAC address request when the virtual apparatus is initialized. A manager allocation method is for allocating the MAC address according to a mapping relationship that is established by a manager designating a MAC address for each apparatus before the virtual apparatus is initialized.

In one of the above-described methods, the ROM 310 stores the plurality of pre-allocated MAC addresses and information on whether each of the plurality of MAC addresses is used or not in the form of a lookup table in order to show whether each of the plurality of MAC addresses is used or not. Accordingly, in response to a specific MAC address being used, the network controller 300 may mark one whether the MAC address is used or not, and, in response to the specific MAC address being withdrawn, the network controller 300 unmarks on whether the MAC address is used or not.

FIGS. 4 to 7 are views illustrating a method of allocating a MAC address in a system with an MR-IOV-based multi host environment.

Figure 4:
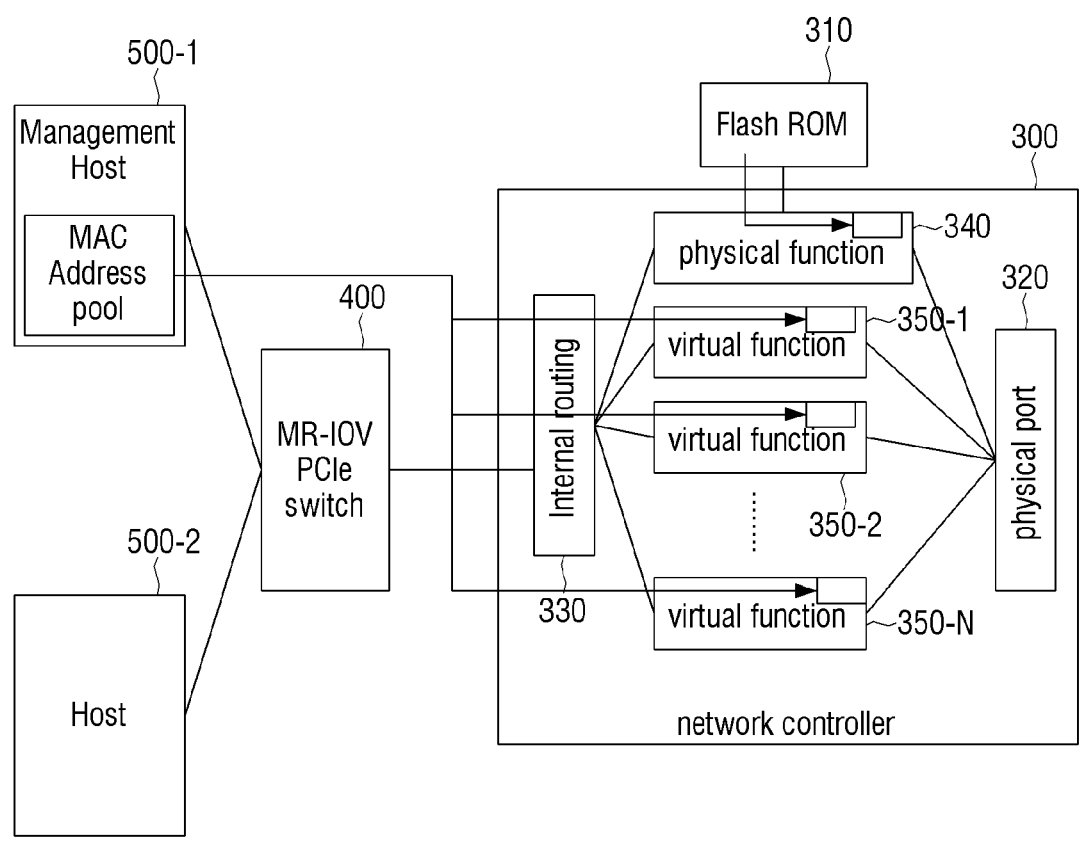
FIGS. 4 to 7 are views illustrating a method of allocating a MAC address in an MR-IOV-based multi host environment.

FIG. 4 illustrates a method of allocating a MAC address when a first host apparatus 500-1 stores a MAC address pool in the system with the MR-IOV-based multi host environment.

Referring to FIG. 4, in the MR-IOV-based multi host environment, one of a plurality of host apparatuses 150-1 and 150-2 may serve as a management host (or an IOV management host). Hereinafter, the first host 500-1 may be referred to as the management host according to a control of a MR-IOV PCIe switch 400. The management host 500-1 manages initialization of an apparatus supporting an I/O virtualization function and a connection structure between a PCIe physical/virtual apparatus and a host. The management host 500-1 may also manage initialization of the physical apparatus/virtual apparatuses in the network controller 300.

The first host 500-1 stores the plurality of MAC addresses pre-allocated to the micro server 100. The plurality of MAC addresses are MAC addresses for one or more virtual apparatuses (350-1, 350-2, . . . . , and 350-N). That is, the MAC address for the physical apparatus 340 is stored in the above-described ROM 310 and is automatically allocated by the network controller 300 according to a control of the MR-IOV PCIe switch 400.

In addition, the first host 500-1 may allocate the MAC address to a corresponding virtual apparatus in response to the virtual apparatus 350 being initialized. The allocation method may be one of the sequential allocation method, the random allocation method, and the manager allocation method described above.

In the illustrated example, the MAC address is stored by the first host 500. However, the MAC address may be stored by another apparatus according to a user or design preference.

Figure 5:
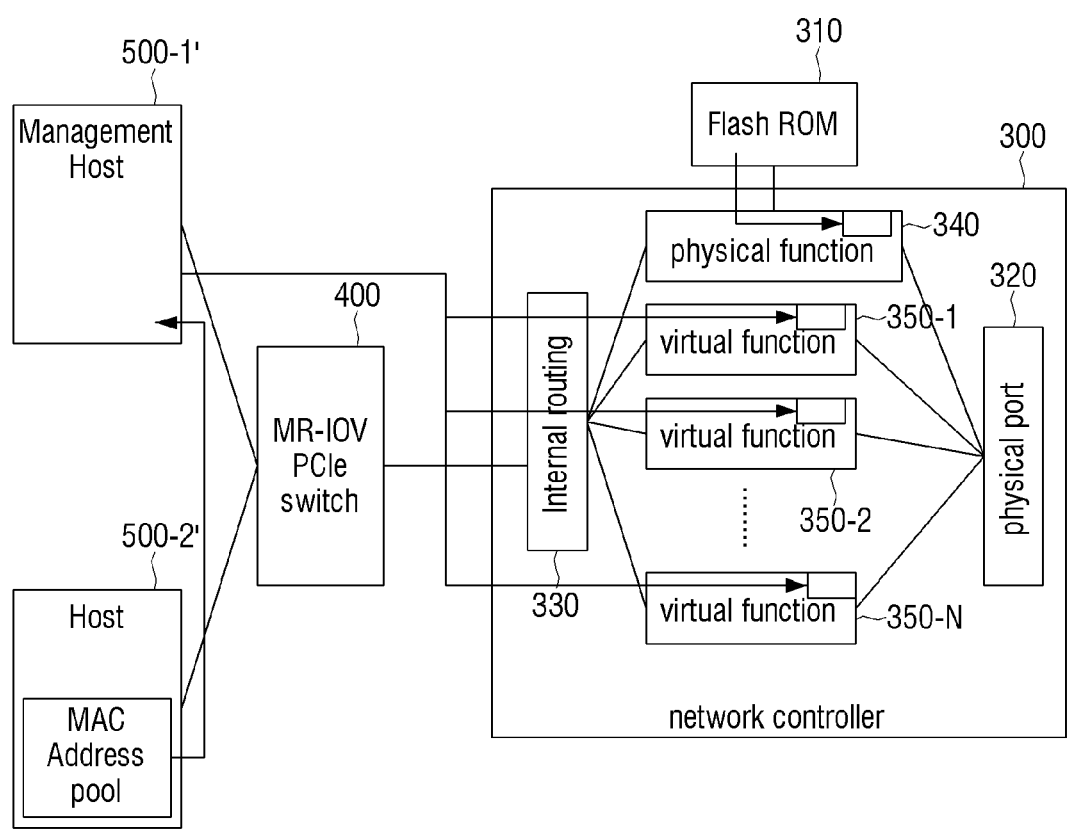

FIG. 5 is a view illustrating a method of allocating a MAC address when a second host apparatus 500-2 stores a MAC address pool in a system with the MR-IOV-based multi host environment.

Referring to FIG. 5, in the MR-IOV-based multi host environment, the second host 500-2' stores the plurality of MAC addresses pre-allocated to the micro server 100.

A first host 500-1' may allocate the MAC address to each virtual apparatus 350 by using the MAC addresses stored in the second host 500-2' in response to the virtual apparatus 350 being initialized, according to a control of the MR-IOV PCIe switch 400. The allocation method may be one of the sequential allocation method, the random allocation method, and the manager allocation method described above.

Figure 6:
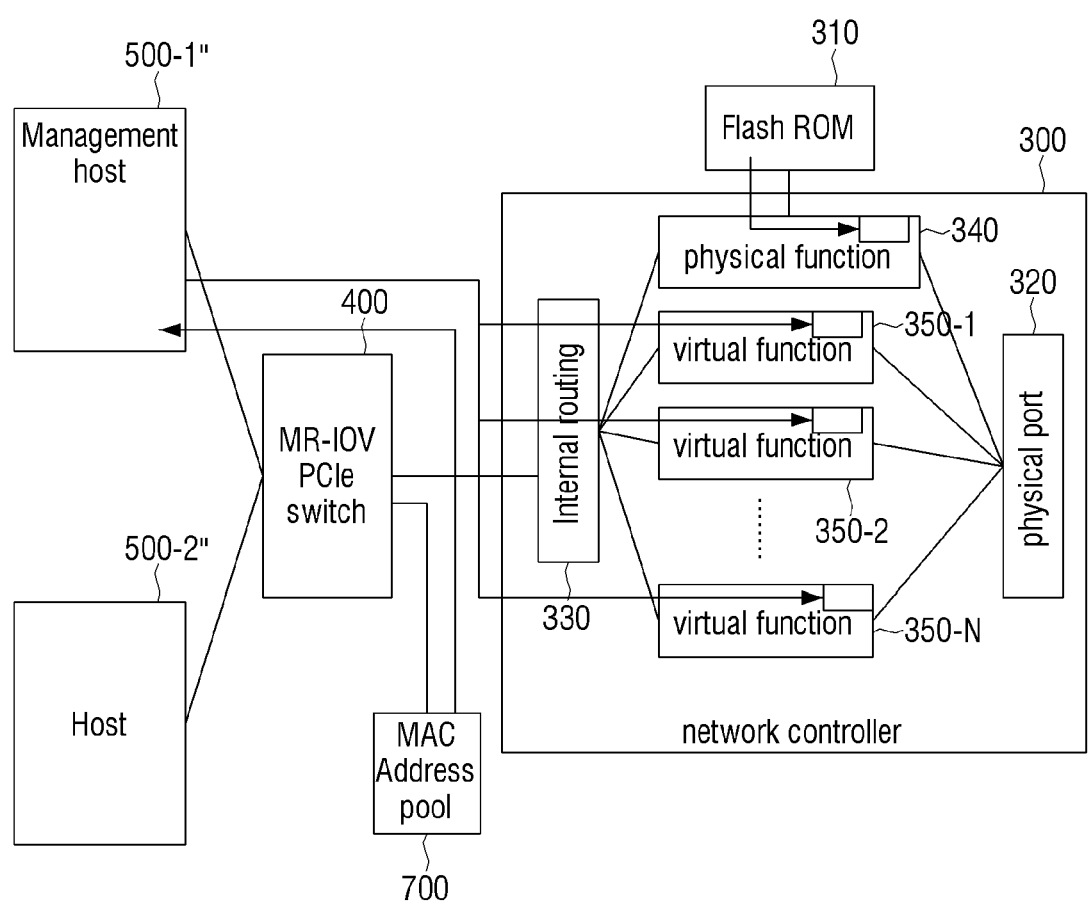

FIG. 6 is a view illustrating a method of allocating a MAC address when a storage 700 stores a MAC address pool in the MR-IOV-based multi host environment.

Referring to FIG. 6, the storage 700 in the micro server 100 stores the plurality of MAC addresses. The storage 700 is connected with a switch 400, for example, an MR-IOV PCIe switch.

Accordingly, a first host 500-1" receives the MAC address stored in the storage 700 through the switch 400 in response to the virtual apparatus 350 being initialized and allocates the MAC address to the virtual apparatus 350. The allocation method may be one of the sequential allocation method, the random allocation method, and the manager allocation method described above.

Figure 7:
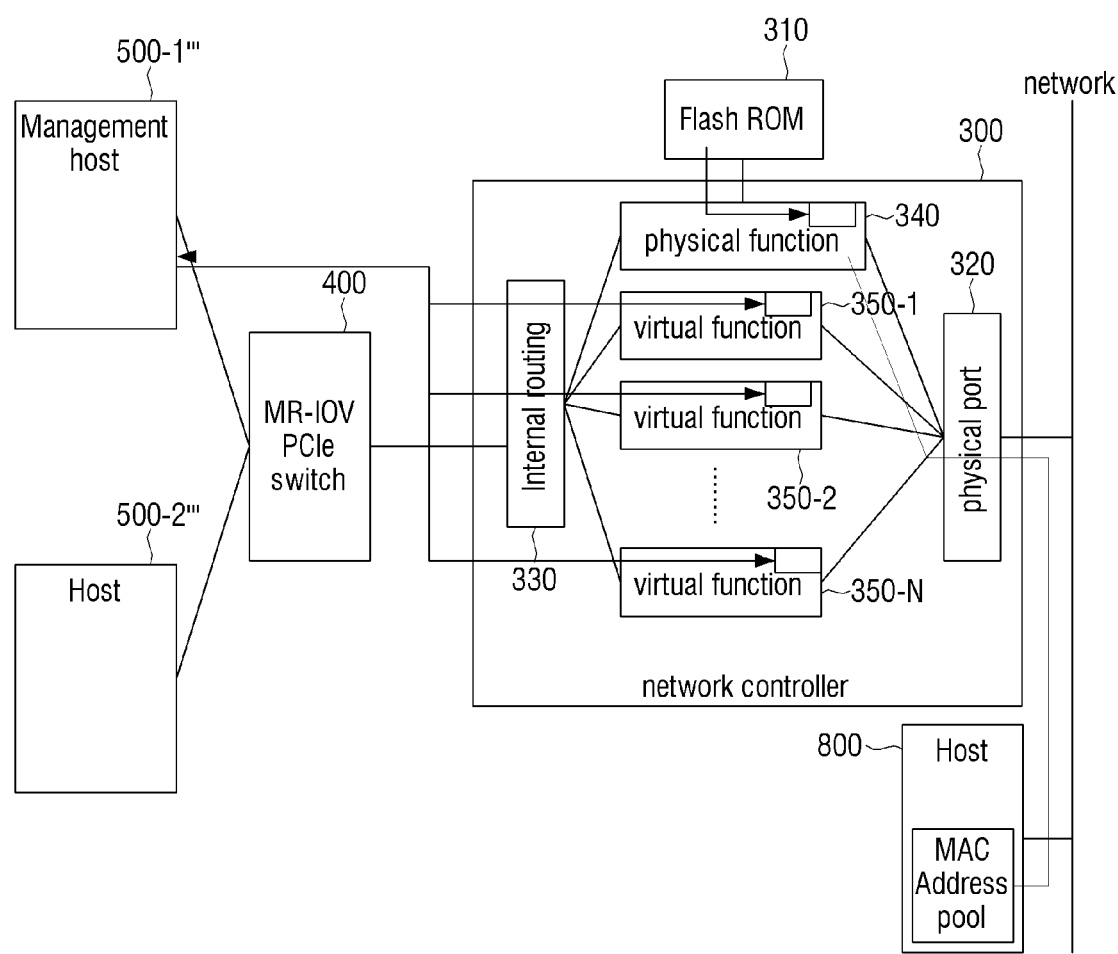

FIG. 7 is a view illustrating a method of allocating a MAC address when an external apparatus 800 stores a MAC address pool in a system with the MR-IOV-based multi host environment.

Referring to FIG. 7, the external apparatus 800 located outside the micro server 100 stores the plurality of MAC addresses. The external apparatus 800 may be a management server or a dedicated storage apparatus to store the MAC address only. The external apparatus 800 may be selectively connected to the micro server 100 according to a wired or wireless communication method.

The physical apparatus 340 can be operated even before the virtual apparatus 350 of the network controller 300 is initialized. Accordingly, a first host 500-1''' may bring the MAC address stored in the external apparatus 800 through the physical apparatus 340 in response to the virtual apparatus 350 being initialized and may allocate the MAC address to the virtual apparatus 350. The allocation method may be one of the sequential allocation method, the random allocation method, and the manager allocation method described above.

In the above-described exemplary embodiments, the MAC address allocation method when the plurality of processor modules are connected with the single network controller by using the I/O virtualization method, that is, through the MR-IOV. However, the exemplary embodiments can be applied in a hypervisor environment in which a plurality of OSs are virtualized in a single apparatus. A method for allocating a MAC address in the hypervisor environment will be explained below with reference to FIGS. 8 to 10.

Figure 8:
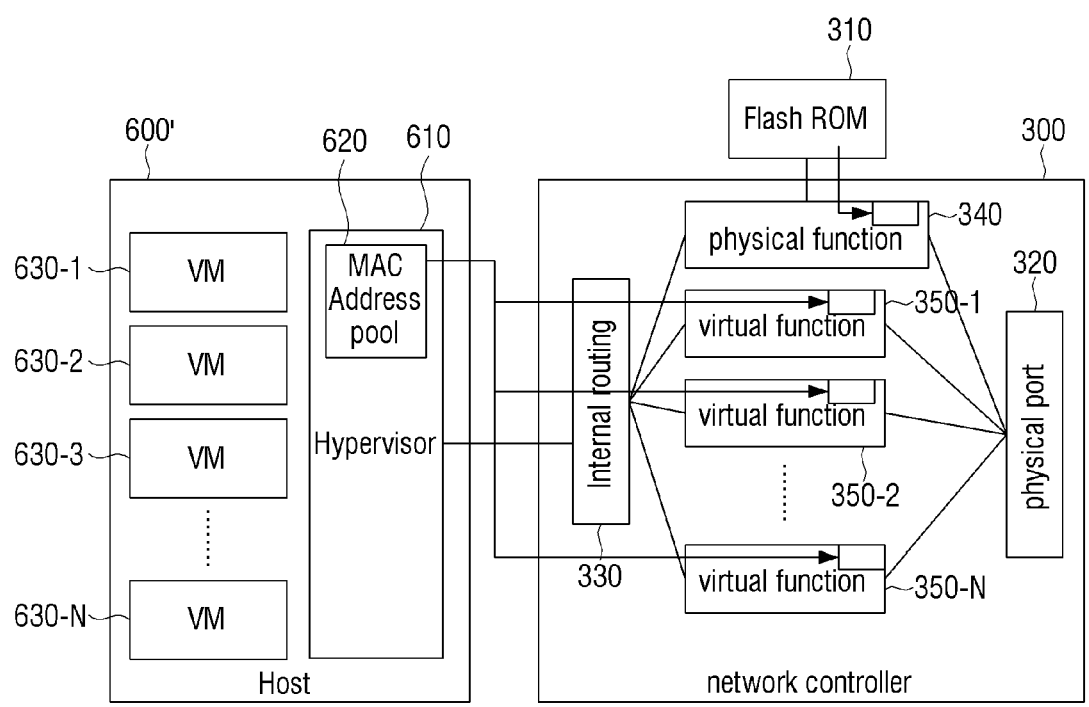
FIGS. 8 to 10 are views illustrating a method of allocating a MAC address in a hypervisor environment.
Figure 9:
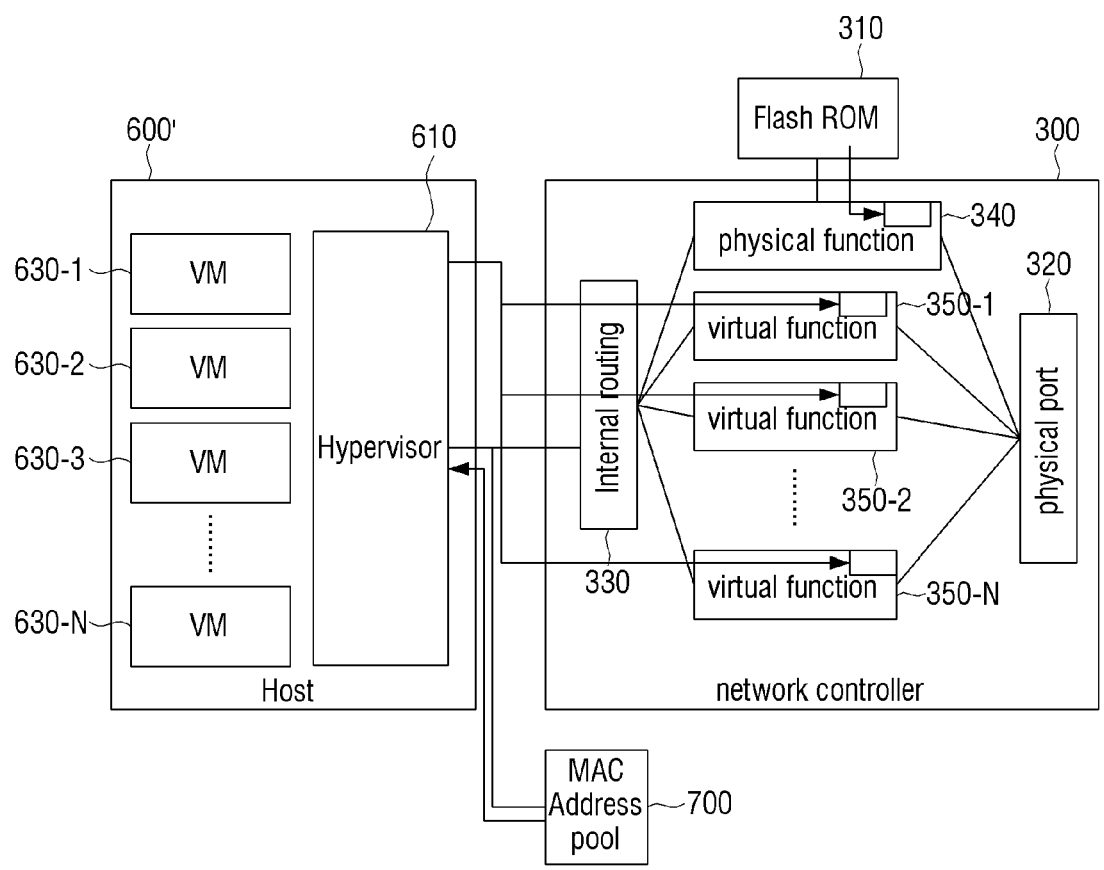
Figure 10:
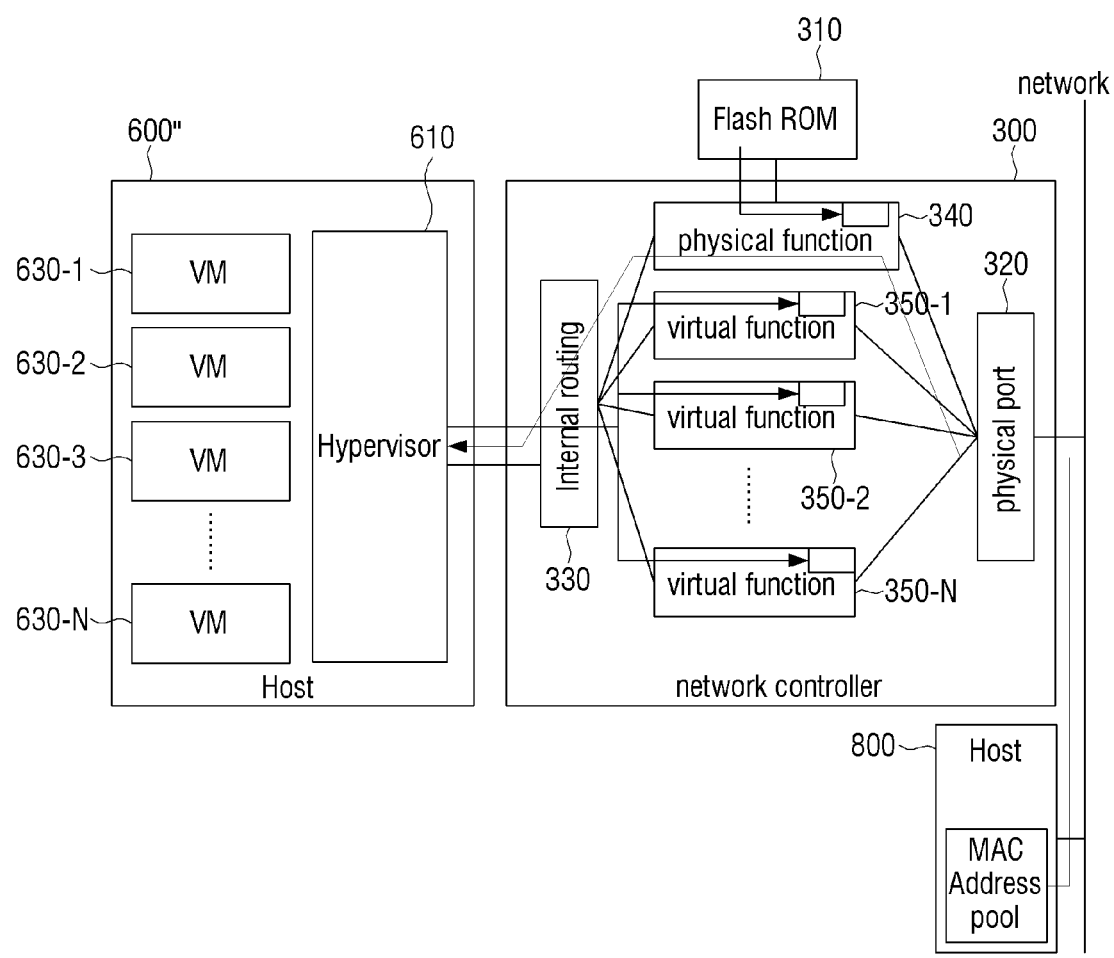

FIGS. 8 to 10 are views illustrating a method of allocating a MAC address in a system with a hypervisor environment.

FIG. 8 Illustrates a method of allocating a MAC address when a hypervisor 600 stores a MAC address pool in the system with the hypervisor environment.

Referring to FIG. 8, the plurality of MAC addresses pre-allocated to the micro server 100 are stored in a storage 620 managed by the hypervisor 610.

In the hypervisor environment, a virtual machine (VM) 630 (630-1, 630-2, 630-3, . . . 630-N) may be set to use a constant MAC address. Accordingly, the hypervisor 610 may allocate the MAC address to the virtual apparatus 350 in response to the virtual apparatus 350 being initialized. In addition, the hypervisor 610 may allocate the virtual apparatus 350 allocated the MAC address to the VM. The allocation method may be one of the sequential allocation method, the random allocation method, and the manager allocation method described above.

FIG. 9 is a view illustrating a method of allocating a MAC address when a storage 700 stores a MAC address pool in a system with a hypervisor environment.

Referring to FIG. 9, the storage 700 in the micro server 100 stores the plurality of MAC addresses.

Accordingly, a hypervisor 610' may transmit the MAC address through a switch 400 in response to the virtual apparatus 350 being initialized and may allocate the MAC address to the virtual apparatus 350. The allocation method may be one of the sequential allocation method, the random allocation method, and the manager allocation method described above.

The hypervisor 610' may allocate the virtual apparatus 350 allocated the MAC address to the VM.

FIG. 10 is a view illustrating a method of allocating a MAC address when an external apparatus 800 stores a MAC address pool in a system with a hypervisor environment.

Referring to FIG. 10, the external apparatus 800 located outside the micro server 100 stores the plurality of MAC addresses. The external apparatus 800 may be a management server or a dedicated storage apparatus for storing only the MAC address. The external apparatus 800 may be selectively connected to the micro server 100 according to a wired or wireless communication method The physical apparatus 340 can be operated even before the virtual apparatus of the network controller is initialized. Accordingly, a hypervisor 610" may bring the MAC address stored in the external apparatus 800 through the physical apparatus 340 in response to the virtual apparatus 350 being initialized and may allocate the MAC address to the virtual apparatus 350. The allocation method may be one of the sequential allocation method, the random allocation method, and the manager allocation method described above.

Figure 11:
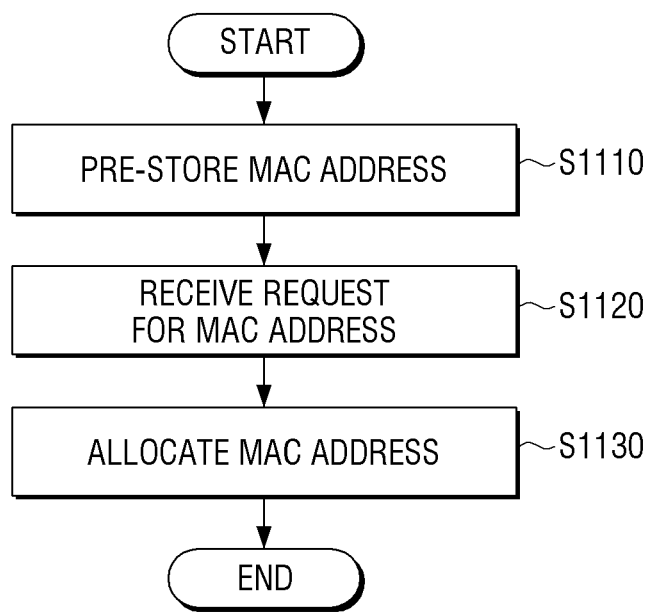
FIG. 11 is a flowchart illustrating a method of allocating a MAC address according to an exemplary embodiment of the present general inventive concept.

FIG. 11 is a flowchart illustrating a method of allocating a MAC address according to an exemplary embodiment of the present general inventive concept.

Referring to FIG. 11, a plurality of MAC addresses pre-allocated to a micro server are pre-stored at operation S1110. The plurality of pre-allocated MAC addresses may correspond to the number of servers (or systems) installable in the micro server.

A virtual apparatus in a network controller is requested to be initialized at operation S1120. The initialization of the virtual apparatus may be requested by an OS of one of a plurality of processor modules.

In response to the request, one of the plurality of MAC addresses is allocated to the virtual apparatus at operation S1130. For example, the MAC address is allocated to the virtual apparatus by using one of the methods, a sequential allocation method of allocating the first MAC address that has not been allocated to the other apparatuses from among the plurality of MAC addresses according to an initialization order of the virtual apparatuses, a random allocation method of allocating a certain MAC address that has not yet been allocated from among the plurality of MAC addresses in response to a MAC address request when the virtual apparatus is initialized, and a manager allocation method of allocating the MAC address according to a mapping relationship that is established by a manager designating a MAC address for each apparatus before the virtual apparatus is initialized.

According to the MAC address allocation method according to the exemplary embodiments, the micro server communicates with the external apparatus by using the plurality of MAC addresses pre-allocated to the micro server. Therefore, the micro server can use the same MAC addresses even in response to a network card being changed or a host being replaced. Accordingly, the S/W license problem caused by the change in the MAC address can be prevented. The MAC address allocation method illustrating in FIG. 11 may be executed in the micro server having the configuration of FIG. 1 or may be executed in a micro server having other configurations.

The MAC address allocation method described above may be implemented as at least one execution program to execute the MAC address allocation method, and the execution program may be stored in a computer readable recording medium.

Accordingly, each block of the exemplary embodiments may be embodied as a computer recordable code on a non-transitory computer readable medium. The non-transitory computer readable medium may be a device that can store data readable by a computer system.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A micro server comprising:
a plurality of processor modules; and
a network controller configured to control the plurality of processor modules to communicate with an external apparatus through a single physical port,
wherein the network controller performs the communication by using a plurality of MAC addresses pre-allocated to the micro server,
wherein the network controller comprises a physical apparatus and a virtual apparatus which are mapped onto the plurality of processor modules,
wherein each of the physical apparatus and the virtual apparatus is allocated one of the plurality of MAC addresses pre-allocated to the micro server, and
wherein the network controller, in response to a request for an initialization of the virtual apparatus, receives a MAC address stored in an external apparatus storing a plurality of MAC addresses through the physical apparatus and allocates the MAC address to the virtual apparatus.

2. The micro server of claim 1, wherein the network controller comprises a ROM configured to store the plurality of pre-allocated MAC addresses.

3. The micro server of claim 2, wherein the ROM stores the plurality of pre-allocated MAC addresses and information on whether each of the plurality of MAC addresses is allocated or not in a form of a lookup table.

4. The micro server of claim 2, wherein the ROM is separable from the network controller.

5. The micro server of claim 2, wherein, in response to a request for an initialization of the virtual apparatus, the network controller allocates one of the plurality of MAC addresses stored in the ROM to the virtual apparatus.

6. The micro server of claim 5, wherein, in response to a request for an initialization of the virtual apparatus, the network controller allocates one of the plurality of MAC addresses to the virtual apparatus, which is requested to be initialized, in one of a sequential allocation method of allocating in sequence, a random allocation method of allocating randomly, and a manager allocation method of allocating according to a specific relationship therebetween.

7. The micro server of claim 2, wherein, in response to a request for an initialization of the virtual apparatus, one of the plurality of processor modules allocates one of the plurality of MAC addresses stored in the ROM to the virtual apparatus.

8. The micro server of claim 2, wherein a first processor module of the plurality of processor modules stores the plurality of MAC addresses pre-allocated to the micro server, and, in response to a request for an initialization of the virtual apparatus, a second processor module of the plurality of processor modules allocates one of the plurality of MAC addresses stored in the first processor module to the virtual apparatus.

9. The micro server of claim 1, wherein the external apparatus stores the plurality of MAC addresses pre-allocated to the micro server, and
wherein a first processor module of the plurality of processor modules allocates one of the plurality of MAC addresses stored in the external apparatus to each virtual apparatus.

10. The micro server of claim 1, further comprising a switch configured to selectively connect the network controller and the plurality of processor modules.

11. The micro server of claim 10, wherein the switch supports Multi Root-Input Output Virtualization (MR-IOV).

12. The micro server of claim 10, wherein the switch virtualizes I/O for the plurality of processor modules by using a full virtualization method using a hypervisor.

13. A method of allocating a MAC address of a micro server, the method comprising:
pre-storing a plurality of MAC addresses pre-allocated to the micro server;
requesting a virtual apparatus in a network controller to be initialized; and
in response to the request, allocating one of the plurality of MAC addresses to the virtual apparatus,
wherein the network controller comprises a physical apparatus and a virtual apparatus which are mapped onto the plurality of processor modules,
wherein each of the physical apparatus and the virtual apparatus is allocated one of the plurality of MAC addresses pre-allocated to the micro server, and
wherein the network controller, in response to a request for an initialization of the virtual apparatus, receives a MAC address stored in an external apparatus storing a plurality of MAC addresses through the physical apparatus and allocates the MAC address to the virtual apparatus.

14. The method of claim 13, wherein the pre-storing comprises storing the plurality of pre-allocated MAC addresses to a ROM in the network controller.

15. The method of claim 14, wherein the ROM stores the plurality of pre-allocated MAC addresses and information on whether each of the plurality of MAC addresses is allocated or not in a form of a lookup table.

16. The method of claim 13, wherein the allocating comprises allocating one of the plurality of MAC addresses to the virtual apparatus, which is requested to be initialized, in one of a sequential allocation method of allocating in sequence, a random allocation method of allocating randomly, and a manager allocation method of allocating according to a specific relationship therebetween.

17. The method of claim 13, wherein the allocating is performed in one of a plurality of processor modules in the micro server.

18. The method of claim 13, wherein:
the pre-storing comprises storing the plurality of MAC addresses in a first processor module of a plurality of processor modules in the micro server; and
the allocating is performed by a second processor module of the plurality of processor modules.

19. A non-transitory computer readable recording medium containing computer-readable codes as a program to execute the method of 13.

20. A micro server comprising:
a plurality of processor modules; and
a network controller configured to receive from an external apparatus a plurality of MAC addresses each to be exclusively assigned to the corresponding one of the processor modules and to control the plurality of processor modules each to communicate with an external apparatus through a single physical port using the exclusively assigned MAC address,
wherein the network controller comprises a physical apparatus and a virtual apparatus which are mapped onto the plurality of processor modules,
wherein each of the physical apparatus and the virtual apparatus is allocated one of the plurality of MAC addresses pre-allocated to the micro server, and
wherein the network controller, in response to a request for an initialization of the virtual apparatus, receives a MAC address stored in an external apparatus storing a plurality of MAC addresses through the physical apparatus and allocates the MAC address to the virtual apparatus.

* * * * *